(12) United States Patent
Wang et al.

(10) Patent No.: US 12,156,544 B2
(45) Date of Patent: Dec. 3, 2024

(54) QUICK LIQUID INJECTION STRUCTURE AND AEROSOL GENERATING DEVICE

(71) Applicant: SHENZHEN WOODY VAPES TECHNOLOGY CO., LTD., Guangdong (CN)

(72) Inventors: Junwen Wang, Guangdong (CN); Youming Liu, Guangdong (CN); Yanming Niu, Guangdong (CN)

(73) Assignee: SHENZHEN WOODY VAPES TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/626,351

(22) Filed: Apr. 4, 2024

(65) Prior Publication Data

US 2024/0341362 A1    Oct. 17, 2024

(30) Foreign Application Priority Data

Apr. 13, 2023 (CN) .......................... 202320855174.0

(51) Int. Cl.
*A24F 40/485* (2020.01)
*A24F 40/10* (2020.01)
*A24F 40/42* (2020.01)

(52) U.S. Cl.
CPC ............ *A24F 40/485* (2020.01); *A24F 40/10* (2020.01); *A24F 40/42* (2020.01)

(58) Field of Classification Search
CPC ........ A24F 40/485; A24F 40/10; A24F 40/42; A24F 47/008; B05B 17/00
See application file for complete search history.

(56) References Cited

U.S. PATENT DOCUMENTS

| 11,503,859 B2* | 11/2022 | Hu | .......................... A24F 40/10 |
| 2019/0313694 A1* | 10/2019 | Wei | .......................... A24F 40/48 |
| 2021/0045442 A1* | 2/2021 | Hu | ....................... A61M 11/042 |

FOREIGN PATENT DOCUMENTS

| CN | 110447968 A | * | 11/2019 | ............. A24F 40/10 |
| CN | 210960415 U | * | 7/2020 | |
| CN | 108323822 B | * | 9/2023 | ............. A24F 40/40 |

* cited by examiner

*Primary Examiner* — Hae Moon Hyeon
(74) *Attorney, Agent, or Firm* — PV IP PC; Wei Te Chung

(57) ABSTRACT

Disclosed are a quick liquid injection structure and an aerosol generating device. The quick liquid injection structure includes a valve body, a liquid-injection tube and an elastic member. A gas exhaust hole is disposed on a side wall of the valve body. The liquid-injection tube is coaxially disposed within the valve body, and the liquid-injection tube comprises a liquid-inlet port, a liquid injection passageway and a liquid-outlet hole which are fluidly communicated. The elastic member is sleeved outside the liquid-injection tube, one end of the elastic member abuts against a first abutment part that extends from an outer wall of the liquid-injection tube, and another end of the elastic member abuts against a second abutment part that extends from an inner wall of the valve body. An exhaust gap is formed between the valve body and an end of the liquid-injection tube close to the liquid-inlet port.

15 Claims, 4 Drawing Sheets

QUICK LIQUID INJECTION STRUCTURE AND AEROSOL GENERATING DEVICE

CROSS-REFERENCE TO RELATED APPLICATIONS

This application claims priority to Chinese Patent Application No. 202320855174.0, filed on Apr. 13, 2023, the contents of which are incorporated herein by reference in its entirety.

TECHNICAL FIELD

The present disclosure, in some embodiments, relates to atomizers, and in particular, to a quick liquid injection structure and an aerosol generating device.

BACKGROUND

The conventional aerosol generating devices generally include a sealing cover at a liquid-inlet port, so as to prevent liquid from flowing out of the liquid-inlet port. The sealing cover needs to be pulled out from the liquid-inlet port whenever liquid injection is carried out, resulting in complicated procedures for liquid injection, and reduced sealability of the sealing cover due to multiple insertions and removals. When the desired sealing effect cannot be met, it is necessary to replace the sealing cover, increasing the cost for replacement. Furthermore, the sealing cover can be readily pulled out by children, which in turn leads to contact and accidental ingestion of the liquid inside, resulting in increased safety risks.

SUMMARY

The present disclosure provides a quick liquid injection structure, which solves the problem of complicated liquid injection procedures in the conventional aerosol generating device.

According to some embodiments of the present disclosure, there is provided a quick liquid injection structure, including a valve body, a liquid-injection tube, and an elastic member. A gas exhaust hole is disposed on a side wall of the valve body. The liquid-injection tube is coaxially disposed within the valve body, and the liquid-injection tube comprises a liquid-inlet port, a liquid injection passageway and a liquid-outlet hole which are fluidly communicated. The elastic member is sleeved outside the liquid-injection tube, one end of the elastic member abuts against a first abutment part that extends from an outer wall of the liquid-injection tube, and another end of the elastic member abuts against a second abutment part that extends from an inner wall of the valve body. An exhaust gap is formed between the valve body and an end of the liquid-injection tube close to the liquid-inlet port. In an original state, the gas exhaust hole and the liquid-outlet hole are closed; and in a liquid injection state, pressure is applied to the liquid-injection tube and the elastic member is compressed, so that the gas exhaust hole is free from closure and in communication with the exhaust gap, while the liquid-outlet hole is also free from closure to allow the liquid injection passageway to be in communication with a fluid reservoir to be filled.

According to some embodiments of the present disclosure, there is provided an aerosol generating device including a quick liquid injection structure. The quick liquid injection structure quick liquid injection structure includes a valve body, a liquid-injection tube, and an elastic member. A gas exhaust hole is disposed on a side wall of the valve body. The liquid-injection tube is coaxially disposed within the valve body, and the liquid-injection tube comprises a liquid-inlet port, a liquid injection passageway and a liquid-outlet hole which are fluidly communicated. The elastic member is sleeved outside the liquid-injection tube, one end of the elastic member abuts against a first abutment part that extends from an outer wall of the liquid-injection tube, and another end of the elastic member abuts against a second abutment part that extends from an inner wall of the valve body. An exhaust gap is formed between the valve body and an end of the liquid-injection tube close to the liquid-inlet port. In an original state, the gas exhaust hole and the liquid-outlet hole are closed; and in a liquid injection state, pressure is applied to the liquid-injection tube and the elastic member is compressed, so that the gas exhaust hole is free from closure and in communication with the exhaust gap, while the liquid-outlet hole is also free from closure to allow the liquid injection passageway to be in communication with a fluid reservoir to be filled.

BRIEF DESCRIPTION OF THE DRAWINGS

In order to illustrate the embodiments of the present disclosure clearly, the accompanying drawings are introduced briefly for the description of the embodiments. It is apparent that the accompanying drawings in the following description illustrate some embodiments of the present disclosure, and that other drawings may be made to those skilled in the art based on these drawings without involving any inventive effort.

DETAILED DESCRIPTION OF EMBODIMENTS

Embodiments of the present disclosure will be described below in conjunction with accompanying drawings. It is apparently that the described ones are only a part of embodiments of the present disclosure, rather than all of them. Other embodiments, given according to the embodiments in the present disclosure by those skilled in the art without creative effort, fall within the scope of the present disclosure.

It is to be understood that, terms "include", "including", "comprise", "comprising", "have", or "having", as used in the present disclosure, mean the presence of a feature, an overall, a step, an operation, an element and/or a component, but do not exclude the presence or addition of one or more other features, overalls, steps, operations, elements, components and/or, a combination thereof.

It is also to be understood that, terms as used herein are merely used for the purpose of description of particular embodiments, not intended to limit the present disclosure. As used in the present disclosure, a singular form "a", "an", and "the" are intended to include the plural form, unless the context clearly indicates otherwise.

It is also to be understood that, the term "and/or" as used herein refers to any and all possible combinations of one or more of the listed items, and includes these combinations.

Figure 1:
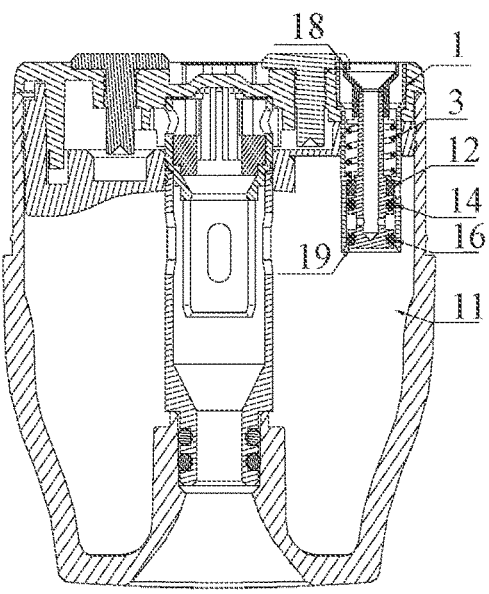
FIG. 1 is a schematic sectional view of an aerosol generating device according to some embodiments of the present disclosure (in a non-liquid injection state, i.e., an original state).
Figure 2:
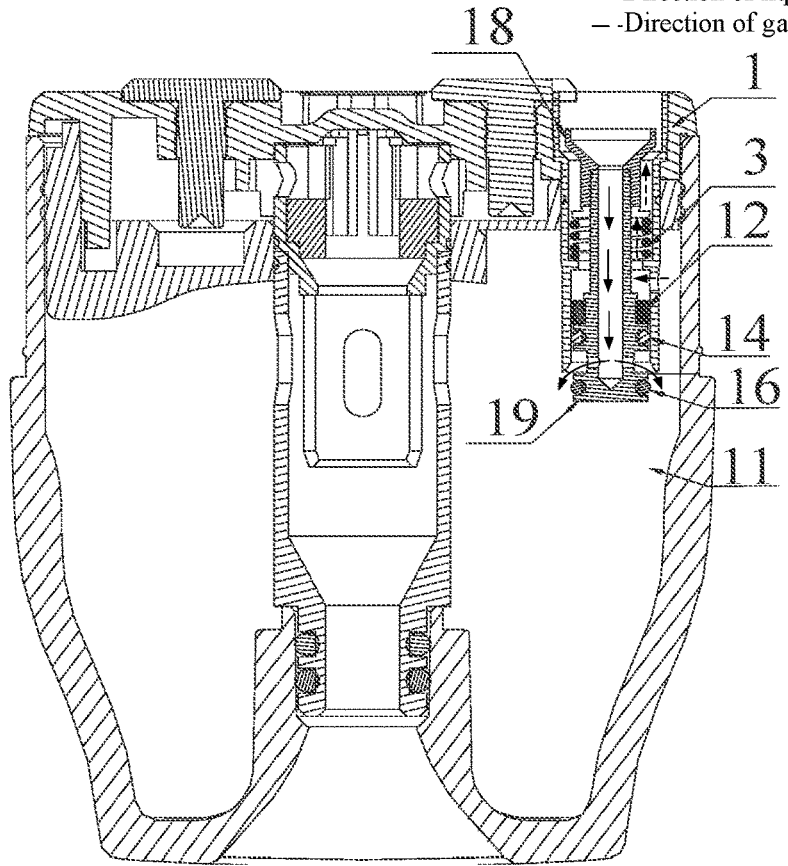
FIG. 2 is a schematic sectional view of an aerosol generating device according to some embodiments of the present disclosure (in a liquid injection state).
Figure 3:
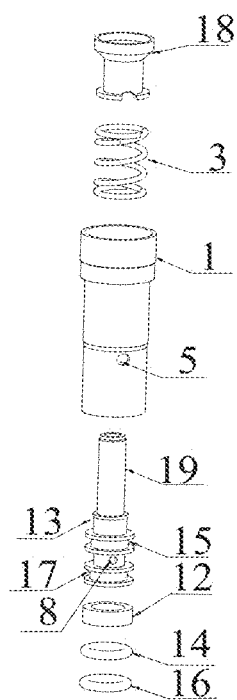
FIG. 3 is an exploded view of a quick liquid injection structure according to some embodiments of the present disclosure.
Figure 4:
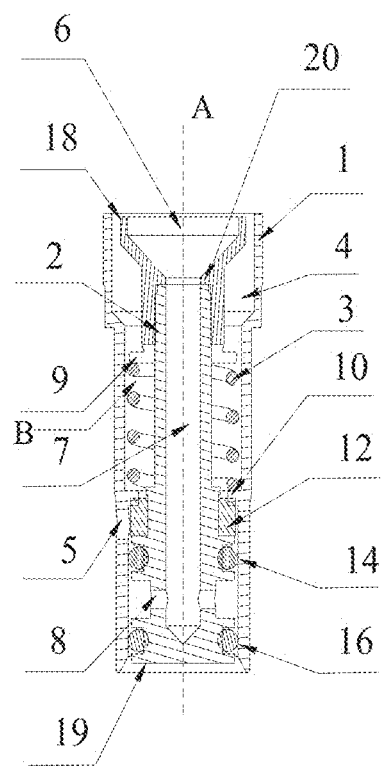
FIG. 4 is a schematic sectional view of a quick liquid injection structure in a first view angle, according to some embodiments of the present disclosure (in a non-liquid injection state).
Figure 5:
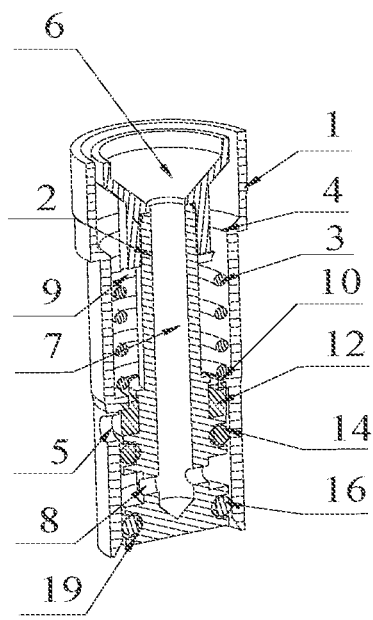
FIG. 5 is a schematic sectional view of a quick liquid injection structure in a second view angle, according to some embodiments of the present disclosure (in a non-liquid injection state).
Figure 6:
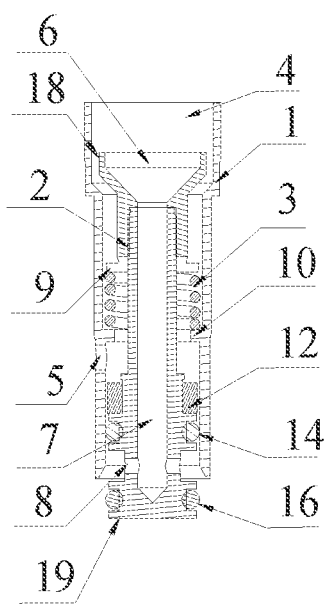
FIG. 6 is a schematic sectional view of a quick liquid injection structure in a first view angle, according to some embodiments of the present disclosure (in a liquid injection state).
Figure 7:
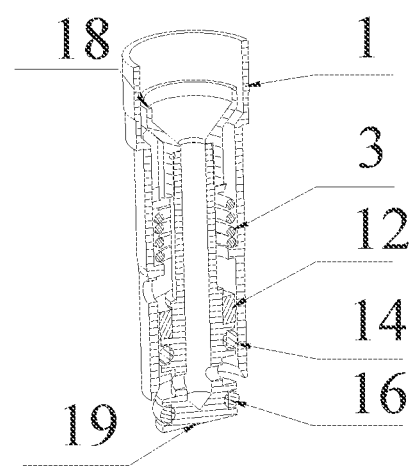
FIG. 7 is a schematic sectional view of a quick liquid injection structure in a second view angle, according to some embodiments of the present disclosure (in a liquid injection state).

Referring to FIGS. 1 to 7, there is provided a quick liquid injection structure, including a valve body 1, a liquid-injection tube 2, and an elastic member 3. A cavity 4 is formed within the valve body 1 in an axial direction, and a gas exhaust hole 5 is disposed on a side wall of the valve body 1. The liquid-injection tube 2 is disposed in the chamber 4. The liquid-injection tube 2 includes a liquid-inlet port 6, a liquid-injection passageway 7, and a liquid-outlet hole 8, which are sequentially connected to form a liquid injection channel. The elastic member 3 is sleeved outside the liquid-injection tube 2. One end of the elastic member 3 abuts against a first abutment part 9 that extends from an outer wall of the liquid-injection tube 2, and another end of the elastic member 3 abuts against a second abutment part 10 that extends from an inner wall of the valve body 1. An exhaust gap B is formed between the valve body 1 and an end of the liquid-injection tube 2 close to the liquid-inlet port 6. Wherein, the elastic member 3 may be a spring, or other elastic elements capable of being compressed.

In an original state (i.e., in a non-liquid injection state), the gas exhaust hole 5 is closed by the liquid-injection tube 2, while the liquid-outlet hole 8 is closed by the valve body 1. Then, a downward pressure is applied on the liquid-injection tube 2, for example, with a liquid-filled bottle that is inserted into the liquid-inlet port 6 and pushed, so as to drive the liquid-injection tube 2 to move downward while compressing the elastic member 3 (i.e., in the liquid injection state). In the liquid injection state, the gas exhaust hole 5 and the liquid-outlet hole 8 are free from the blocking of the liquid-injection tube 2 and the valve body 1, respectively, and the exhaust gap B is in communication with the gas exhaust hole 5, while the liquid-injection channel is in communication with a fluid reservoir 11 to be filled.

In some embodiments, when the liquid-filled bottle is inserted into the liquid-inlet port 6 to press it, air gas is exhausted through a gap along the side of the valve body 1. Instead, in the case that the liquid-inlet port 6 is not pressed, the elastic member 3 is in a reset state, and the entire assembly is sealed, which may eliminate the need to remove the sealing cap individually, thereby facilitating use and improving the user experience.

It is also to be noted that, according to the embodiments of the present disclosure, the gas exhaust hole 5 may be provided below the second abutment part 10, between the first abutment part 9 and the second abutment part 10, or above the first abutment part 9.

According to the embodiments of the present disclosure, a sealing member is used to seal the gas exhaust hole 5 and the liquid-outlet hole 8, since the valve body 1 and the liquid-injection tube 2 may be damaged due to long-term wear during their operation and they are expensive to replace. Therefore, the use of the sealing member can reduce the cost, and increase the sealability of the quick liquid-injection structure. According to some embodiments of the present application, a first sealing member 12 is sleeved on the outer wall of the liquid-injection tube 2 corresponding to the gas exhaust hole 5. A first groove 13 is circumferentially disposed on the outer wall of the liquid-injection tube 2 to hold the first sealing member 12. A second sealing member 14 is sleeved on the outer wall of the liquid-injection tube 2 corresponding to a position between the gas exhaust hole 5 and the liquid-outlet hole 8. A second groove 15 is circumferentially disposed on the outer wall of the liquid-injection tube 2 to hold the second sealing member 14. A third sealing member 16 is sleeved on the outer wall of the liquid-injection tube 2 corresponding to a position between the liquid-outlet hole 8 and an end of the liquid-injection tube 2 close to the liquid-outlet hole 8. A third groove 17 is disposed on the outer wall of the liquid-injection tube 2 to hold the third sealing member 16. It is to be noted that the description with regard to the above sealing members and grooves are referred to the quick liquid-injection structure in the original state, but not in the liquid injection state.

The quick liquid-injection structure may be operated with the following principle: in the original state, a gap between the liquid-injection tube 2, the elastic member 3 and the valve body 1 forms the exhaust gap B, which is sealed by the first sealing member 12, the second abutment part 10 and a corresponding convex of the liquid-injection tube 2, so that the communication between the exhaust gap B and the gas exhaust hole 5 is blocked. In addition, the second sealing member 14 and the outer wall of the liquid-injection tube 2, together with the inner wall of the valve body 1, form a seal structure, which blocks the communication between the liquid injection channel and the gas exhaust hole 5, and the third sealing member 16 and the outer wall of the liquid-injection tube 2, together with the inner wall of the valve body 1, forms a seal structure, which blocks the communication between the liquid injection channel and the fluid reservoir 11.

When a liquid outlet of the liquid-filled bottle is inserted into the liquid-inlet port 6 to apply pressure to the liquid-injection tube 2 and to compress the elastic member 3, a combined structure of the liquid-injection tube 2, the elastic member 3, the first sealing member 12, the second sealing member 14, and the third sealing member 16 moves downward. Another exhaust gap is formed between the first sealing member 12 and the second abutment part 10. The another exhaust gap is in communication with the exhaust gap B between the liquid-injection tube 2, the elastic member 3, and the valve body 1, as well as the gas exhaust hole 5, and passes directly to the atmosphere to form a gas exhaust passage. A liquid inlet gap is formed between the third sealing member 16 and the valve body 1. The liquid inlet gap is in communication with the liquid-injection channel to the fluid reservoir 11. Therefore, the liquid in the liquid-filled bottle enters the fluid reservoir 11 through the liquid injection channel, and the gas present in the fluid reservoir 11 is discharged into the atmosphere through the gas exhaust channel. Otherwise, the elastic member 3 is reset and returns to the original state.

The first sealing member 12, the second sealing member 14, and the third sealing member 16 may be made of one of butadiene-acrylonitrile rubber, ethylene-propylene-diene rubber, fluororubber, silicone rubber, fluorosilicone rubber, nylon, polyurethane, or engineering plastic, respectively. In some embodiments of the present application, the first sealing member 12, the second sealing member 14, and the third sealing member 16 are made of silicone rubber.

In another embodiment of the present application, the liquid-injection tube 2 includes a liquid-feed part 18 and a liquid-transport part 19. The liquid-feed part 18 includes a first end and a second end, in which the first end of the liquid-feed part 18 is provided with the liquid-inlet port 6, and the second end of the liquid-feed part 18 is sleeved outside the liquid-transport part 19 and abuts against the top of the liquid-transport part 19. The first abutment part 9 is provided on an outer wall of the second end of the liquid-feed part, the liquid-injection passageway 7 is provided inside the liquid-transport part 19, and the liquid-outlet hole 8 is disposed on the side wall of the liquid-transport part 19. The elastic member 3 is sleeved outside the liquid-transport part 19.

A third abutment part 20 is circumferentially disposed on the inner wall of the liquid-feed part 18, with protruding toward the central axis of the liquid-feed part 18. The top of the liquid-transport part 19 abuts against the third abutment part 20, so that the liquid-transport part 19 moves downward when the liquid-feed part 18 moves in the same direction.

Generally, the liquid-filled bottle may be deviated from the liquid-inlet port 6 when placed into it. The liquid-inlet port 6, according to some embodiments of the present application, is therefore designed into a bell shape, and the liquid-filled bottle may slide along a slope surface of the bell-shaped portion, and then aligns with the liquid-inlet port 6, thereby achieving accurate liquid injection.

The liquid-feed part 18 and the liquid-transport part 19 may be detachably arranged. The top end of the elastic member 3 abuts against the first abutment part 9, and the bottom end of the elastic member 3 abuts against the second abutment part 10. When the liquid-filled bottle is inserted into the liquid-inlet port 6 to apply pressure downward, the liquid-feed part 18 is subjected to a downward force, pressing the elastic member 3 downward using the first abutment part 9 thereon, while the second abutment part 10 is immovable on the valve body 1, and thus the elastic member 3 is gradually compressed. As a result, both the liquid-feed part 18 and the liquid-transport part 19 move downward with the compression of the elastic member 3.

The first groove 13, the second groove 15, and the third groove 17 are all circumferentially provided along the outer wall of the liquid-transport part 19.

After the liquid injection is completed and the liquid-filled bottle is removed, the elastic member 3 gradually resets, driving the liquid-feed part 18 together with the liquid-transport part 19 to upwardly move, which may result in that the third sealing member 16 enters the valve body 1 again from the outside of the valve body 1. During this process, the third sealing member 16 is subjected to extrusion between the liquid-injection tube 2 and the valve body 1, thereby causing damage to the third sealing member 16. To reduce the damage, the inner wall of the valve body 1 at the bottom end close to the liquid-outlet hole 8, according to some embodiments of the present application, is set to have a thickness that is gradually increased toward the top end of the valve body 1 from the bottom end thereof, that is, forming an inclined surface with a bell-shaped portion at the end of the valve body 1 close to the liquid-outlet hole 8. Therefore, when the third sealing member 16 enters the valve body 1, the third sealing member 16 moves upward along the inclined surface and is subjected to gradually increased pressure. Then, the contact area of the outer surface of the third sealing member 16 with the valve body 1 is gradually increased. Accordingly, the use of the inclined surface of the valve body 1 may save resources and reduce cost for the replacement of the third sealing member 16.

According to the present disclosure, when the liquid injection tube is pressed, air is exhausted from the gap between the valve body and the liquid-injection tube. At this time, the liquid injection passageway, the liquid-outlet hole and the liquid reservoir are in communication with each other, and then liquid can be injected into the liquid reservoir through the liquid injection passageway and the liquid-outlet hole. When the press on the liquid injection tube is completed, the elastic member is reset, the gas exhaust hole and the liquid-outlet hole are closed. By this arrangement, there is no need to separately remove the sealing cover, leading to simple liquid filling steps, convenient use, and improved experience of the user. In addition, it can prevent children from removing the sealing cover and then contacting the liquid therein, thereby improving safety.

According to some embodiments of the present disclosure, there is also provided an aerosol generating device, including the quick liquid injection structure as explained in the above embodiments.

The embodiments in the specification are described in a progressive manner, individual embodiment focuses on the differences with other embodiments, and the same or similar portions in individual embodiment can be referred to each other. For the device as set forth in the embodiments, the description thereof is relatively simple due to the correspondence to the method as discussed in the embodiments, and the relevant parts can be found in the method section. It is to be noted that, the present disclosure can be improved and modified for a person of ordinary skill in the art without departing from the principle of the present disclosure. Further, these improvements and modifications also fall within the scope of the claims as accompanied below in the present disclosure.

It is also to be noted that in this specification, relational terms such as "first" and "second" are used only to distinguish one entity or operation from another, rather require or imply the existence of any such actual relationship or order between these entities or operations. Further, the terms "including", "include", "comprising", "comprise" or any other variant thereof are non-exclusive.

Comprising/including means that a process, method, article or apparatus comprises not only these listed elements, but also other elements that are not explicitly listed, and that are inherent to such process, method, article or apparatus. Without further limitation, the fact that an element is defined by a phase "including a/an . . . " does not preclude the existence of another identical element in the process, method, article or apparatus that includes the said element.

What is claimed is:

1. A quick liquid injection structure, comprising a valve body, a liquid-injection tube, and an elastic member;
   wherein a gas exhaust hole is disposed on a side wall of the valve body,
   the liquid-injection tube is coaxially disposed within the valve body, the liquid-injection tube comprises a liquid-inlet port, a liquid injection passageway and a liquid-outlet hole which are fluidly communicated,
   the elastic member is sleeved outside the liquid-injection tube, one end of the elastic member abuts against a first abutment part that extends from an outer wall of the liquid-injection tube, another end of the elastic member abuts against a second abutment part that extends from an inner wall of the valve body, and an exhaust gap is formed between the valve body and an end of the liquid-injection tube close to the liquid-inlet port, wherein the liquid-injection tube further comprises a liquid-feed part and a liquid-transport part, the liquid-feed part comprises a first end and a second end, the first end is provided with the liquid-inlet port, and the second end is sleeved outside the liquid-transport part and abuts against the top of the liquid-transport part, the first abutment part is disposed on an outer wall of the second end, the liquid injection passageway is disposed in the liquid-transport part, and the liquid-outlet hole is disposed on a side wall of the liquid-transport part, and the elastic member is sleeved on an outer wall of the liquid-transport part, and wherein in an original state, the gas exhaust hole and the liquid-outlet hole are closed; and in a liquid injection state, pressure is applied to the liquid-injection tube and the elastic member is compressed, so that the gas exhaust hole is free from closure and in communication with the exhaust gap, while the liquid-outlet hole is also free from closure to allow the liquid injection passageway to be in communication with a fluid reservoir to be filled.

2. The quick liquid injection structure according to claim 1, wherein a first sealing member is sleeved on the outer wall of the liquid-injection tube corresponding to the gas exhaust hole, a second sealing member is sleeved on the outer wall of the liquid-injection tube corresponding to a position between the gas exhaust hole and the liquid-outlet hole, and a third sealing member is sleeved on the outer wall of the liquid-injection tube corresponding to a position between the liquid-outlet hole and an end of the liquid-injection tube close to the liquid-outlet hole.

3. The quick liquid injection structure according to claim 2, wherein a first groove is circumferentially disposed on the outer wall of the liquid-injection tube to hold the first sealing member, a second groove is circumferentially disposed on the outer wall of the liquid-injection tube to hold the second sealing member, and a third groove is disposed on the outer wall of the liquid-injection tube to hold the third sealing member.

4. The quick liquid injection structure according to claim 1, wherein an inner wall of the valve body close to the liquid-outlet hole is set to have an inclined surface.

5. A quick liquid injection structure, comprising a valve body and a liquid-injection tube;

wherein a gas exhaust hole is disposed on a side wall of the valve body, the liquid-injection tube is coaxially disposed within the valve body, the liquid-injection tube is movable up and down along a central axis with respect to the valve body, the liquid-injection tube comprises a liquid-inlet port, a liquid injection passageway and a liquid-outlet hole which are fluidly communicated, and an exhaust gap is formed between the valve body and an end of the liquid-injection tube close to the liquid-inlet port, wherein the liquid-injection tube further comprises a liquid-feed part and a liquid-transport part, the liquid-feed part comprises a first end and a second end, the first end is provided with the liquid-inlet port, and the second end is sleeved outside the liquid-transport part and abuts against the top of the liquid-transport part, the liquid injection passageway is disposed in the liquid-transport part, and the liquid-outlet hole is disposed on a side wall of the liquid-transport part, and wherein in an original state, the gas exhaust hole and the liquid-outlet hole are closed;

and in a liquid injection state, pressure is applied to the liquid-injection tube to move the liquid-injection tube downward, so that the gas exhaust hole is free from closure and in communication with the exhaust gap, while the liquid-outlet hole is also free from closure to allow liquid to flow out along the liquid injection passageway.

6. The quick liquid injection structure according to claim 5, further comprising an elastic member, wherein the elastic member is sleeved outside the liquid-injection tube, one end of the elastic member abuts against a first abutment part that extends from an outer wall of the liquid-injection tube, and another end of the elastic member abuts against a second abutment part that extends from an inner wall of the valve body.

7. The quick liquid injection structure according to claim 5, wherein a first sealing member is disposed on the liquid-injection tube to close the gas exhaust hole, and a second sealing member is disposed on the liquid-injection tube between the gas exhaust hole and the liquid-outlet hole, in the original state.

8. The quick liquid injection structure according to claim 7, wherein a third sealing member is further disposed on the liquid-injection tube between the liquid-outlet hole and an end of the liquid-injection tube close to the liquid-outlet hole.

9. The quick liquid injection structure according to claim 8, wherein each of the first sealing member, the second sealing member, and the third sealing member are at least one of a sealing ring or a protrusion extending from the outer wall of the liquid-injection tube toward the valve body.

10. The quick liquid injection structure according to claim 5, wherein the liquid-inlet port is set to have a bell shape.

11. The quick liquid injection structure according to claim 5, wherein an inner wall of the valve body close to the liquid-outlet hole is set to have an inclined surface.

12. An aerosol generating device comprising a quick liquid injection structure, wherein the quick liquid injection structure comprises a valve body and a liquid-injection tube;

a gas exhaust hole is disposed on a side wall of the valve body, the liquid-injection tube is coaxially disposed within the valve body, the liquid-injection tube is movable up and down along a central axis with respect to the valve body, the liquid-injection tube comprises a liquid-inlet port, a liquid injection passageway and a liquid-outlet hole which are fluidly communicated, and an exhaust gap is formed between the valve body and an end of the liquid-injection tube close to the liquid-inlet port, wherein the liquid-injection tube further comprises a liquid-feed part and a liquid-transport part, the liquid-feed part comprises a first end and a second end, the first end is provided with the liquid-inlet port, and the second end is sleeved outside the liquid-transport part and abuts against the top of the liquid-transport part, the liquid injection passageway is disposed in the liquid-transport part, and the liquid-outlet hole is disposed on a side wall of the liquid-transport part, and in an original state, the gas exhaust hole and the liquid-outlet hole are closed; and in a liquid injection state, pressure is applied to the liquid-injection tube to move the liquid-injection tube downward, so that the gas exhaust hole is free from closure and in communication with the exhaust gap, while the liquid-outlet hole is also free from closure to allow liquid to flow out along the liquid injection passageway.

13. The aerosol generating device according to claim 12, wherein the quick liquid injection structure comprises an elastic member, and the elastic member is sleeved outside the liquid-injection tube, one end of the elastic member abuts against a first abutment part that extends from an outer wall of the liquid-injection tube, and another end of the elastic member abuts against a second abutment part that extends from an inner wall of the valve body.

14. The aerosol generating device according to claim 12, wherein a first sealing member is disposed on the liquid-injection tube to close the gas exhaust hole, and a second sealing member is disposed on the liquid-injection tube between the gas exhaust hole and the liquid-outlet hole, in the original state.

15. The aerosol generating device according to claim 14, wherein a third sealing member is further disposed on the liquid-injection tube between the liquid-outlet hole and an end of the liquid-injection tube close to the liquid-outlet hole.

* * * * *